United States Patent
Peng

(10) Patent No.: US 6,485,433 B1
(45) Date of Patent: Nov. 26, 2002

(54) EAR THERMOMETER WITH ROTATABLE AND REVOLVABLE DETECTOR PROBE

(76) Inventor: Shao-Yu Peng, 239-67 Changyuan Rd., Huatan Hsiang, Changhua Hsien (TW)

( * ) Notice: Subject to any disclaimer, the term of this patent is extended or adjusted under 35 U.S.C. 154(b) by 0 days.

(21) Appl. No.: 09/694,382

(22) Filed: Oct. 24, 2000

(30) Foreign Application Priority Data

Sep. 15, 2000 (TW) .................................... 089216078 U

(51) Int. Cl.[7] ............................................... A61B 5/00
(52) U.S. Cl. ........................ 600/549; 600/474; 374/100
(58) Field of Search ................................ 600/474, 549, 600/559; 374/100, 120, 208, 209; 403/122, 127, 133, 135, 141, 142

(56) References Cited

U.S. PATENT DOCUMENTS

| 4,312,358 A | * | 1/1982 | Barney | 600/483 |
|---|---|---|---|---|
| 5,458,121 A | * | 10/1995 | Harada | 600/474 |
| 5,868,685 A | * | 2/1999 | Powell et al. | 600/585 |
| 5,954,669 A | * | 9/1999 | Iseberg | 600/559 |
| 6,059,452 A | * | 5/2000 | Smith et al. | 374/169 |
| 6,097,979 A | * | 8/2000 | Janotte | 600/474 |

FOREIGN PATENT DOCUMENTS

| JP | 04141138 A | * | 5/1992 | 600/549 |
|---|---|---|---|---|
| JP | 06142061 A | * | 5/1994 | 600/549 |

* cited by examiner

*Primary Examiner*—Kevin Shaver
*Assistant Examiner*—Charles Marmor, II
(74) *Attorney, Agent, or Firm*—Rosenberg, Klein & Lee

(57) ABSTRACT

An ear thermometer having a rotatable and revolvable detector probe is provided. The thermometer includes a thermometer body; a detector probe insertable into an external auditory canal; and a connecting device for rotatably and revolvably connecting the detector probe to the thermometer body. The connecting device includes a pivot journal that fixedly engages the thermometer body and receives a portion of the detector probe in pivotally engaged manner.

7 Claims, 4 Drawing Sheets

EAR THERMOMETER WITH ROTATABLE AND REVOLVABLE DETECTOR PROBE

BACKGROUND OF THE INVENTION

1. Field of the Invention

The present invention relates to a newly designed ear thermometer, and more particularly, to an ear thermometer with a rotatable and revolvable detector probe.

2. Description of the Prior Art

An ear thermometer for measuring human body temperature mainly comprises a thermometer gun body; a detector probe fixedly connected to the front end of the gun body, and which is suitable for plugging into the human external auditory canal; a liquid crystal display (LCD); and, an electronic erasable and programmable ROM, By measuring the temperature of the human tympanic membrane with the infrared ray inductive detector probe, an input signal is digitalized by a micro processor provided in the thermometer gun body, and compared with a calibrated datum stored in the ROM, thereby outputting a confirmed value of the measured temperature to the LCD for displaying.

As it is mentioned above, the detector probe of a conventional ear thermometer is fixedly connected to the front end of the gun body so that sensing devices such as a wave guide and an infrared ray inductor can be installed therein. This immovably tilted detector probe may sometimes be difficult to plug into a patient's external auditory canal. For instance, when the ear of the patient is hindered by bed cloths or a pillow; or the available access to the emerged inlet of the patient's external auditory canal does not correspond to the fixed inclination angle of the detector probe, the detector probe may not be sufficiently inserted into the ear, especially to an infant's ear, without causing possible damage. Moreover, such a conventional detector probe may also be dangerous for use with a hyper child or a person of abnormal or weakened mental state who many respond with strong refusal and thereby cause accidental damage to the ear,

SUMMARY OF THE INVENTION

Therefore, it is an object of the present invention to provide an ear thermometer with a three dimensionally rotatable detector probe which may be smoothly and securely plugged into the external auditory canal of a patient in spite of its emerging state.

It is another object of the present invention to provide an ear thermometer with a three dimensionally revolvable detector probe which when being plugged into the patient's ear, is adaptively displaceable so as to avoid puncturing any tissue of the patient's ear in case the operator encounters resistance, In order to achieve the above objects and other advantages, the ear thermometer with a rotatable and revolvable detector probe of the present invention for measuring and displaying the human tympanic membrane temperature comprises a thermometer body; a detector probe having an arcuate neck portion pluggable into the human external auditory canal; and a connecting device for rotatably and revolvably connecting the detector probe to the thermometer body, the connection is carried out by an inwardly deflectable clastomer having an arcuate skirt portion which accommodates an arctuate neck portion of the detector probe in such manner that the detector probe is universally revolvable with respect to the thermometer body. The detector probe can be easily plugged into the patients external auditory canal, no matter how oriented.

BRIEF DESCRIPTION OF THE DRAWINGS

The above and other objects, advantages and features of the present invention will become more readily appreciated and understood from a consideration of the following detailed description of the preferred embodiments of the present invention taken together with the accompanying drawings in which.

DETAILED DESCRIPTION OF THE PREFERRED EMBODIMENTS

Figure 1:
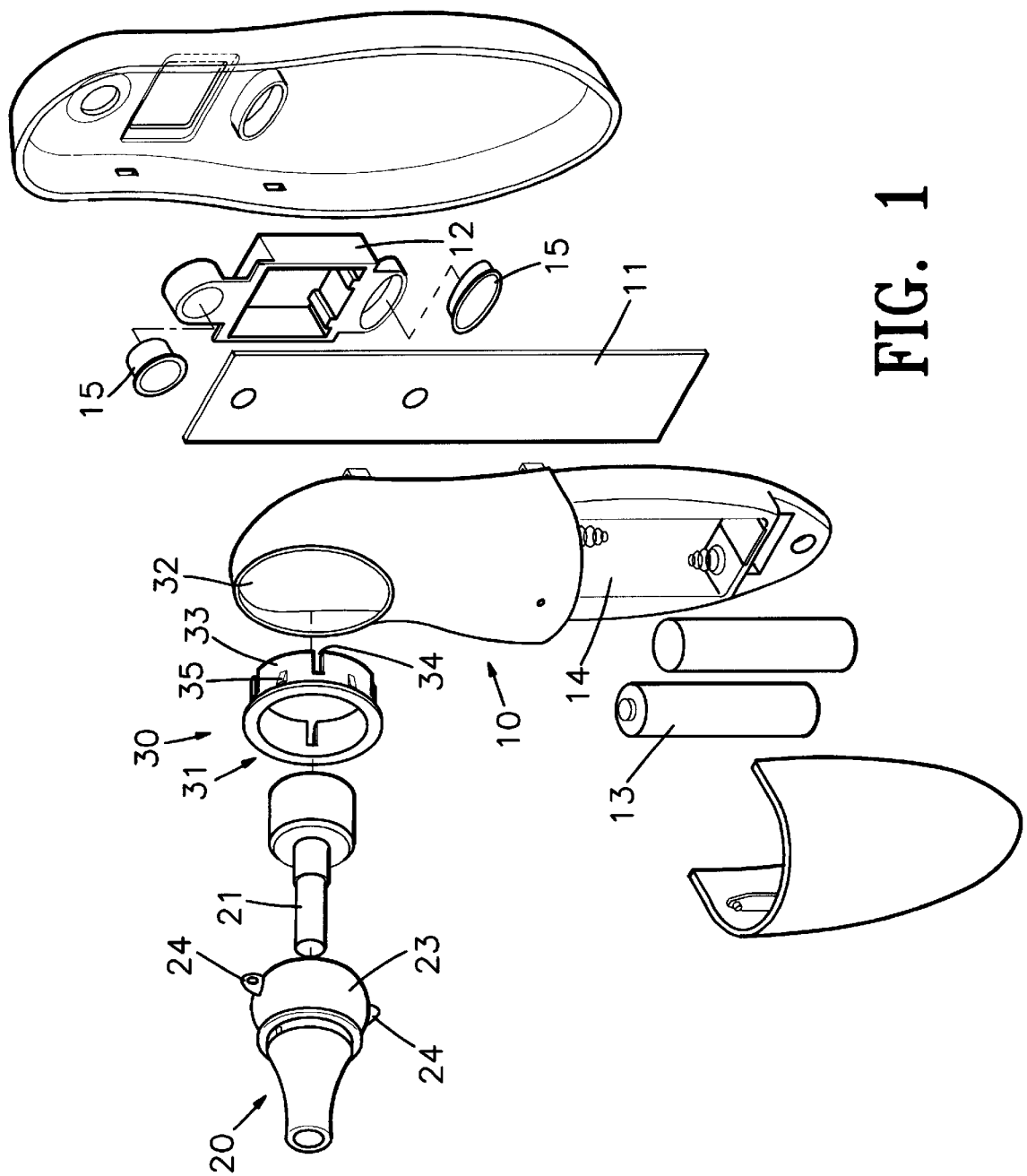
FIG. 1 is a three dimensional exploded view of the present view.
Figure 2:
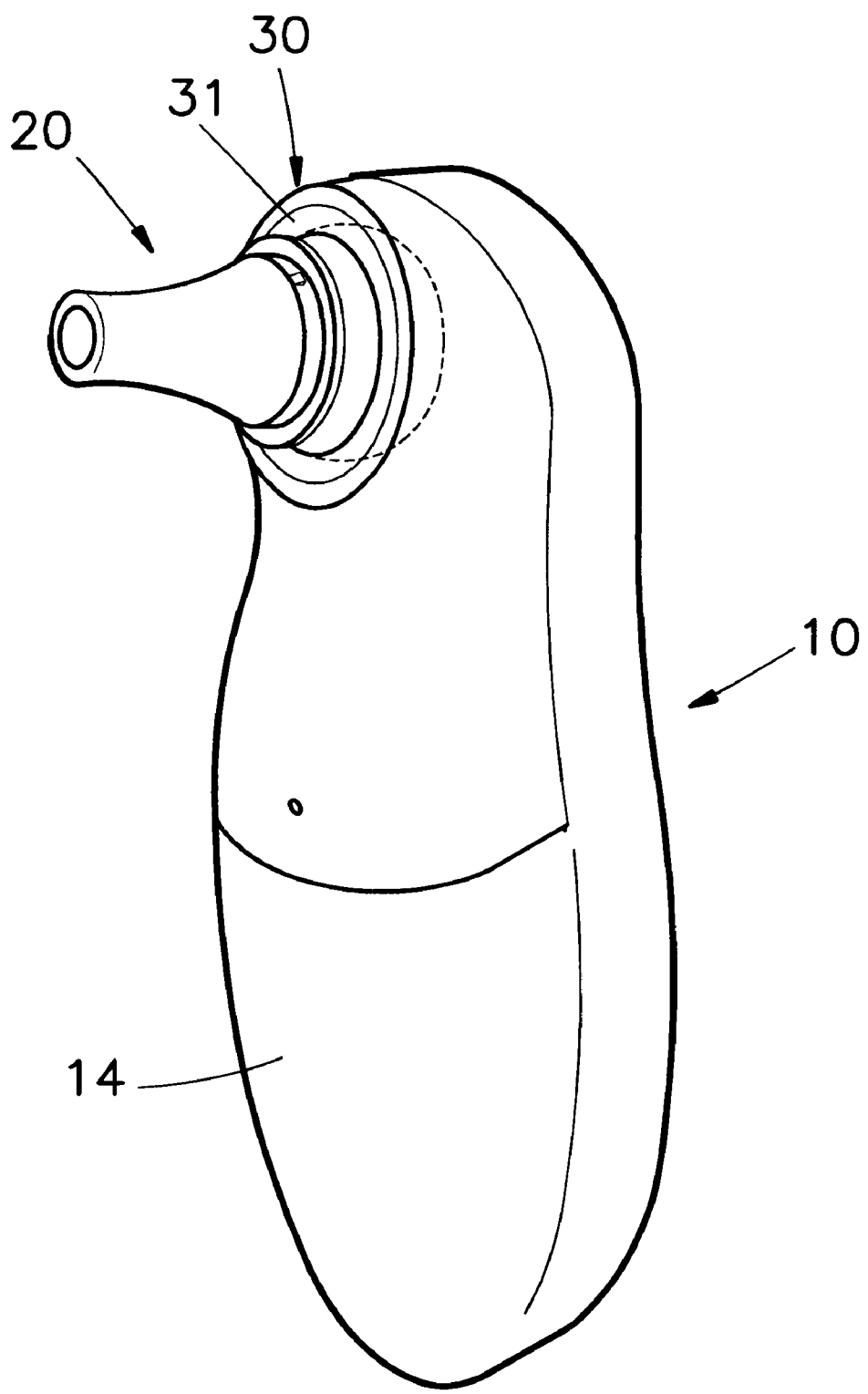
FIG. 2 is a three dimensional perspective view of the present invention.
Figure 3:
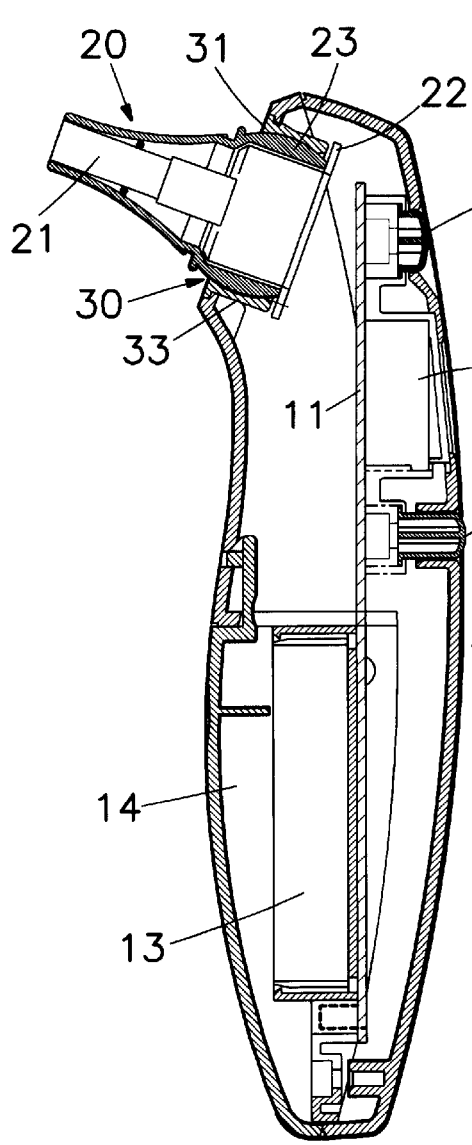
FIG. 3 is a longitudinal cross-sectional view of the present invention.

Referring to FIGS. 1 through 3 simultaneously, the car thermometer with revolvable prove of the present invention for measuring and displaying human tympanic membrane temperature essentially comprises a thermometer body 10; a detector probe 20 pluggable into the human external auditory canal; and a connecting device 30 for rotatably and revolvably connecting the detector probe 20 the thermometer body 10.

The thermometer body 10 further includes a micro processor, and electronic erasable and programmable ROM, an IC board 11 containing several control circuits, a liquid crystal display (LCD) and its base 12 a battery chamber 14 accommodating several batteries 13 and at least one control switch 15. The ear temperature signal corresponding to the infrared ray emitted therefrom is detected by the detector probe 20 and is digitalized by the micro processor and compared with the calibrated datum stored in the erasable and programmable ROM; then the confirmed temperature volume is outputted to the LCD 12 for display. The ear thermometer contains a wave guide 21 and an infrared ray inductor as its sensing elements therein, Such electronic devices common to conventional techniques can also be installed in the thermometer body 10 and the detector probe 20 of the present invention.

Figure 4:
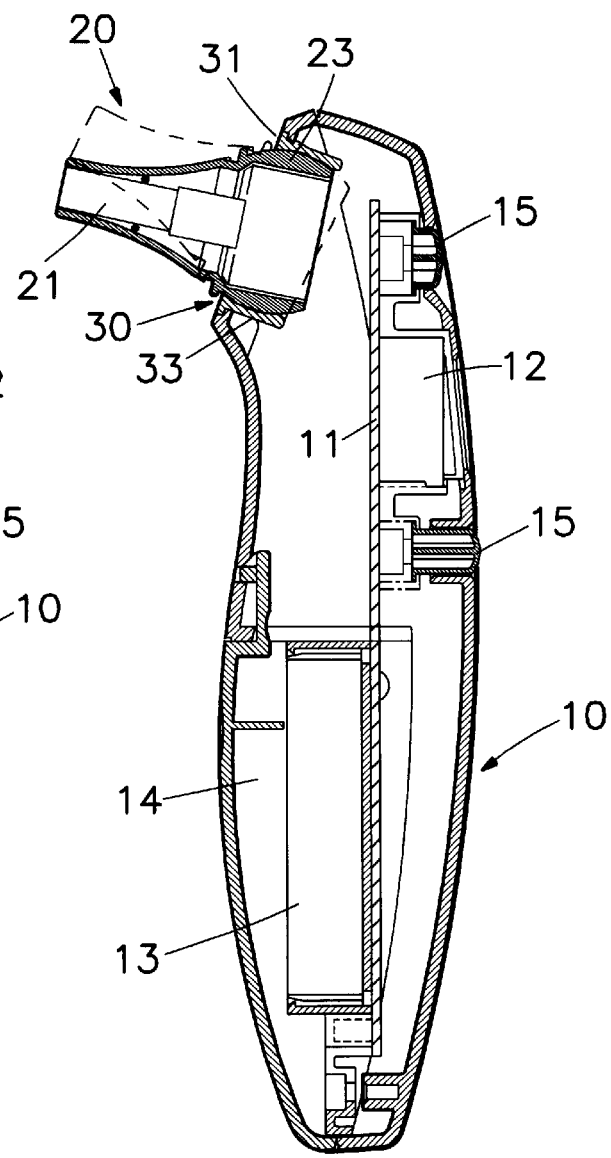
FIG. 4 is a longitudinal cross-sectional view of the present invention when its detector probe is tilted at a different orientation from that shown in FIG. 3; and, FIG. 5 is a partial cross-sectional view of the present invention enclosed in a housing.

Meanwhile the present invention is characterized in that a detector probe 20 is revolvable universally with respect to the thermometer body 10, such that it is self rotatable, enabling it to freely adjust its tilted orientation to adaptively match the direction of the emerged inlet of the patient's external auditory canal. The detector probe 20 can thus be smoothly and securely plugged therein. The detector probe 20 had an arcuate neck portion 23, and the connecting device 30 includes a pivot journal 31 fixedly engaged with an inlaying bole 32 provided at a top end of the thermometer body 10. The pivot journal 31 has an arcuate skirt portion 33 corresponding to the arcuate neck portion 23 of the detector probe 20, and the arcuate skirt portion 33 suspendedly extends into the thermometer body 10. A plurality of parallel axial slots 34 are formed on the arcuate skirt portion 33 to split the skin portion 33 to several inwardly deflectable resilient claws wherein the arcuate neck portion 23 of the detector probe 20 is accommodated. With this structure the detector probe 20 is made revolvable about three dimensions with respect to the thermometer body 10, to thereby be self-rotatable as shown in FIG. 4.

Moreover, several wedge cotters 35, each with a vertical stopper surface are formed on the outer wall surface of the arcuate skirt portion 33. By a stopping function of the wedge cotters 35, backwards slipping of the pivot journal 31 in the inlaying hole 32 is prevented. It should be understood that the engagement of the pivot journal 31 with the thermometer body 10 is by no means limited only to the away described above, other ways such as screw combining, binding with a binder, supersonic wave binding and welding are applicable to the present invention.

Meanwhile a plurality of screw holed lags 24 are formed around the bottom edge of the arcuate neck portion 23 of the detector probe 20 for retaining, for example, a control circuit board 22 of an infrared ray inductor with screws, and/or preventing the detector probe 20 from loosening from the pivot journal 31 after assembly is completed. The outer diametric extent defined by the screw hole lugs 24 is made greater than that of the skirt portion 33 of the journal 31.

Figure 5:
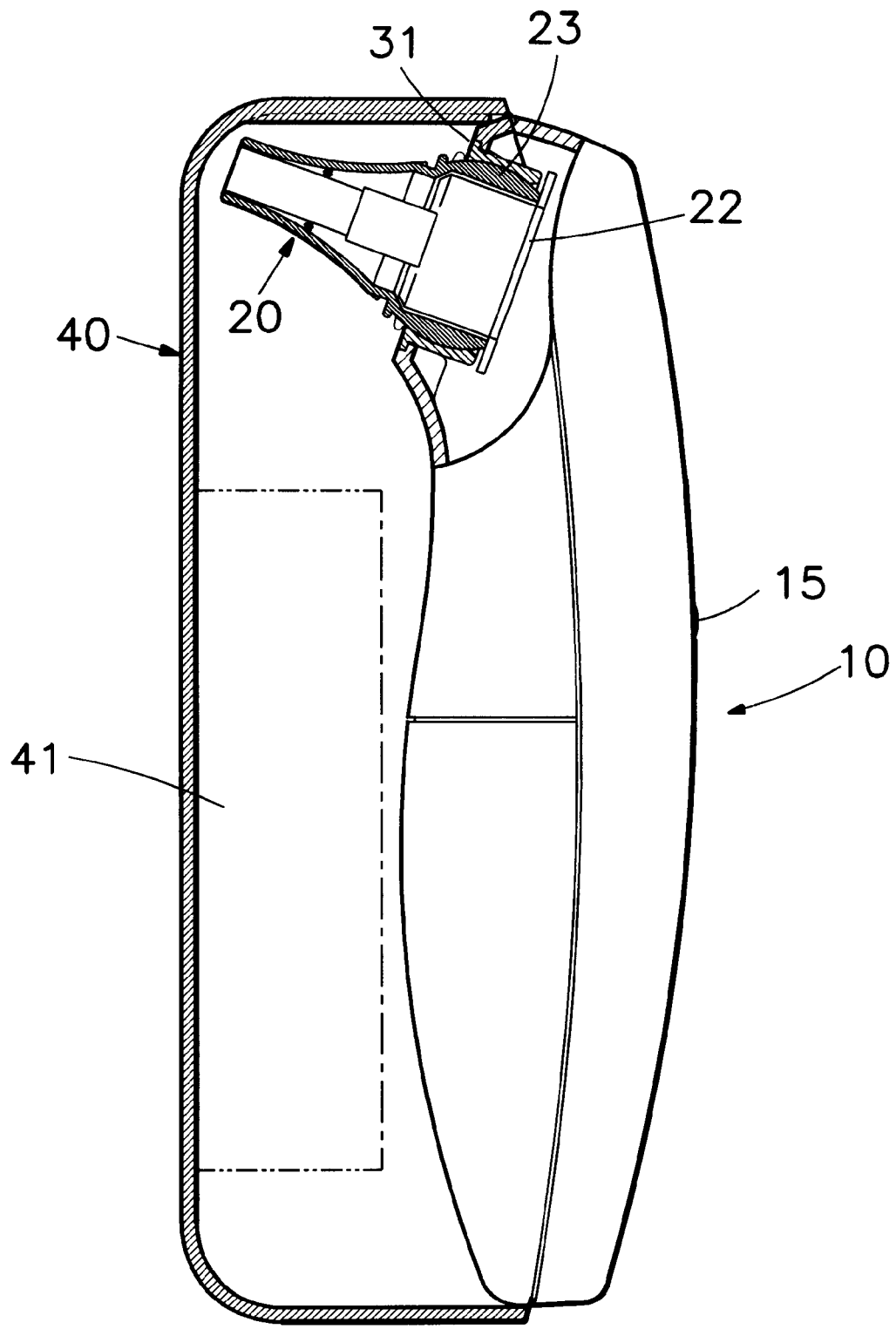

Referring to FIG. 5, a housing 40 can be employed to entirely cover the front portion of the car thermometer of the present invention for protecting the detector probe 20. Furthermore, an accommodation space 41 usable for storing accessories of the thermometer is provided.

From the above description, it is to be understood that the present invention is characterized in that its detector probe is made revolvable about three dimensions with respect to the thermometer body, and is constructed to remain self-rotatable. The detector probe is thus able to adjust in its tilted angle so as to freely match different directional orientations of the merged inlet of a patient's external auditory canal. Hence, the detector probe can smoothly and securely plugged therein.

Many changes and modifications in the above described embodiment of the invention can, of course, be carried out without departing from the scope of the present invention. Accordingly, to promote the progress in science and the useful arts, the invention is disclosed and is intended to be limited only by the scope of the appended claims.

What is claimed is:

1. An ear thermometer for measuring and displaying a tympanic membrane temperature, said ear thermometer comprising:
   (a) a thermometer body having formed in a top end portion thereof an inlaying hole;
   (b) a detector probe for insert into an external auditory canal; and,
   (c) a connecting device rotatably and revolvably connecting said detector probe to said thermometer body, said connecting device including a pivot journal fixedly engaging said inlaying hole of said thermometer body.

2. The ear thermometer as recited in claim 1 wherein said detector probe includes an arcuate neck portion extending therefrom to engage said pivot journal of said connecting device.

3. The ear thermometer as recited in claim 2 wherein said pivot journal includes a deflectable arcuate skirt portion receiving said arcuate neck portion of said detector probe resiliently biased manner.

4. The car thermometer as recited in claim 3 wherein said arcuate skirt portion has formed therein a plurality of axial slots defining a plurality of resiliently deflectable claws.

5. The ear thermometer as recited in claim 3 wherein said arcuate skirt portion of said pivot journal has formed thereon a plurality of radially projecting wedge cotters, each said wedge cotter defining a stopper surface for engaging said thermometer body within said inlaying hole thereof.

6. The ear thermometer as recited in claim 3 wherein said arcuate neck portion of said detector probe has formed thereon a plurality of radially projecting screw holed lugs, said screw holed lugs extending radially beyond a radial extent of said arcuate skirt portion of said pivot journal.

7. An ear thermometer for measuring and displaying a tympanic membrane temperature, said ear thermometer comprising:
   (a) a thermometer body having an inlaying hole formed therein;
   (b) a detector probe for insert into an external auditory canal; and,
   (c) a connecting device coupling said detector probe to said thermometer body, said connecting device including a pivot journal fixedly engaging said inlaying hole of said thermometer body, said pivot journal receiving a portion of said detector probe in pivotally engaged manner.

* * * * *